United States Patent [19]

Crowley et al.

[11] 3,810,023

[45] May 7, 1974

[54] AUTOMATIC SQUELCH TAIL ELIMINATOR FOR TONE CODED SQUELCH SYSTEMS

[75] Inventors: Lee Francis Crowley, Pittsburgh; Dennis Robert Presky, Washington; Andrew Michael Missenda, Pittsburgh, all of Pa.

[73] Assignee: RCA Corporation, New York, N.Y.

[22] Filed: July 21, 1972

[21] Appl. No.: 273,754

[52] U.S. Cl. .................. 325/478, 325/392, 325/466

[51] Int. Cl. .......................................... H04b 1/10

[58] Field of Search ........ 340/171; 325/55, 64, 392, 325/65, 466, 478, 480

[56] References Cited

UNITED STATES PATENTS

| | | | |
|---|---|---|---|
| 3,049,710 | 8/1962 | Buesing et al. | 325/478 |
| 3,584,304 | 6/1971 | Casterline et al. | 325/478 |
| 3,654,555 | 4/1972 | Ryan et al. | 325/478 |

*Primary Examiner*—Robert L. Griffin

*Assistant Examiner*—Jin F. Ng

*Attorney, Agent, or Firm*—Edward J. Norton; Robert L. Troike

[57] ABSTRACT

A squelch tail eliminator for use in a receiver having a continuous tone coded squelch system and provision for the disabling of the tone coded squelch system is disclosed. A pulse generator, responsive to the discontinuance of a given tone, generates a gating pulse that inhibits the disabling of the tone coded squelch system for the time duration of that pulse, providing squelch tail elimination at the end of a message transmission indicated by the discontinuance of the tone.

8 Claims, 2 Drawing Figures

AUTOMATIC SQUELCH TAIL ELIMINATOR FOR TONE CODED SQUELCH SYSTEMS

This invention relates to radio communication systems and particularly to mobile and portable communication systems in which a tone coded squelch system and the disabling of that tone coded squelch system are provided.

In standard land mobile communication receivers, for example, discriminator noise is used to remove signals from the final amplifier stages when no transmissions are received. The detected noise from the discriminator is used to gate off or noise squelch an audio amplifier when transmissions are ended and the carrier is removed. A finite period of time — typically 50–150 milliseconds — is required for the noise squelch to gate off the receiver at the end of transmissions. It is during this period of time that the noise from the discriminator can be heard at the speaker. This noise is sometimes referred to as squelch tail.

In continuous tone coded squelch systems as used in land mobile communications, for example, provision is made for eliminating the squelch tail by the use of the selective calling circuitry. In one type of continuous tone coded squelch system commonly used, the communicating transmitter sends a subaudible tone of one phase while transmitting a message and the same tone but of reverse phase for 150 milliseconds after the message. The receiver which includes a tone sensitive device such as a resonant reed, for example, in response to the tone transmitted with the message causes unsquelching of the receiver. The receiver therefore only receives when its particular tone is transmitted and received. The reversed phase tone following the message damps the reed and results in the squelching of the receiver. This damping and resquelching of the receiver occurs rapidly and provides for the elimination of the squelch tail which would otherwise occur if only noise squelch were employed. For a further discussion of this type of system see Peth U.S. Pat. No. 2,974,221. In other systems, the squelch tail elimination is accomplished by merely continuing carrier transmission for 150 milliseconds after the message without any reverse phase tone.

To comply with the Federal Communications Commission monitoring rules, two-way radio equipment equipped with these tone coded squelch systems must be provided with a means at the receiver for disabling this tone coded squelch system prior to message transmission so that the operator can monitor the frequency channel prior to a transmission. This requirement is necessitated because the tone coded squelch system otherwise blanks out all signals being transmitted with a different tone of the same frequency channel and the operator not hearing these transmissions may break into a conversation.

In order to minimize the number of manual operations required of a mobile communication's operator, it is desirable that the disabling of the tone coded squelch system be automatically provided when the operator desires to transmit. This could be provided by an on-off disable switch associated with the removal of the transmit microphone from its hanger. This removal of the tone coded squelch system for so long as the microphone is out of the hanger, however, causes the local receiver to again be subject to squelch tail noises that occur between received transmissions from the remote party.

The present invention provides, in the receiver of a selective communication system of the type responsive to a carrier wave modulated by audio intelligence signals accompanied by a control tone, a tone coded squelch system responsive to a control signal or tone of a given frequency and phase as transmitted from a remote transmitter. The tone coded squelch system is normally responsive to the carrier wave and the absence of the particular control signal from the remote transmitter to squelch the receiver. The receiver includes a circuit for disabling the tone coded squelch system. An inhibitor circuit is arranged to override and automatically inhibit the disabling circuit for a short time period following the end of a received message and in the absence of the tone accompanying that message, thus automatically providing squelch tail elimination following each received message even though the tone coded squelch system is otherwise disabled.

DETAILED DESCRIPTION

A more detailed description follows in conjunction with the figures of the accompanying drawing, wherein.

Figure 1:
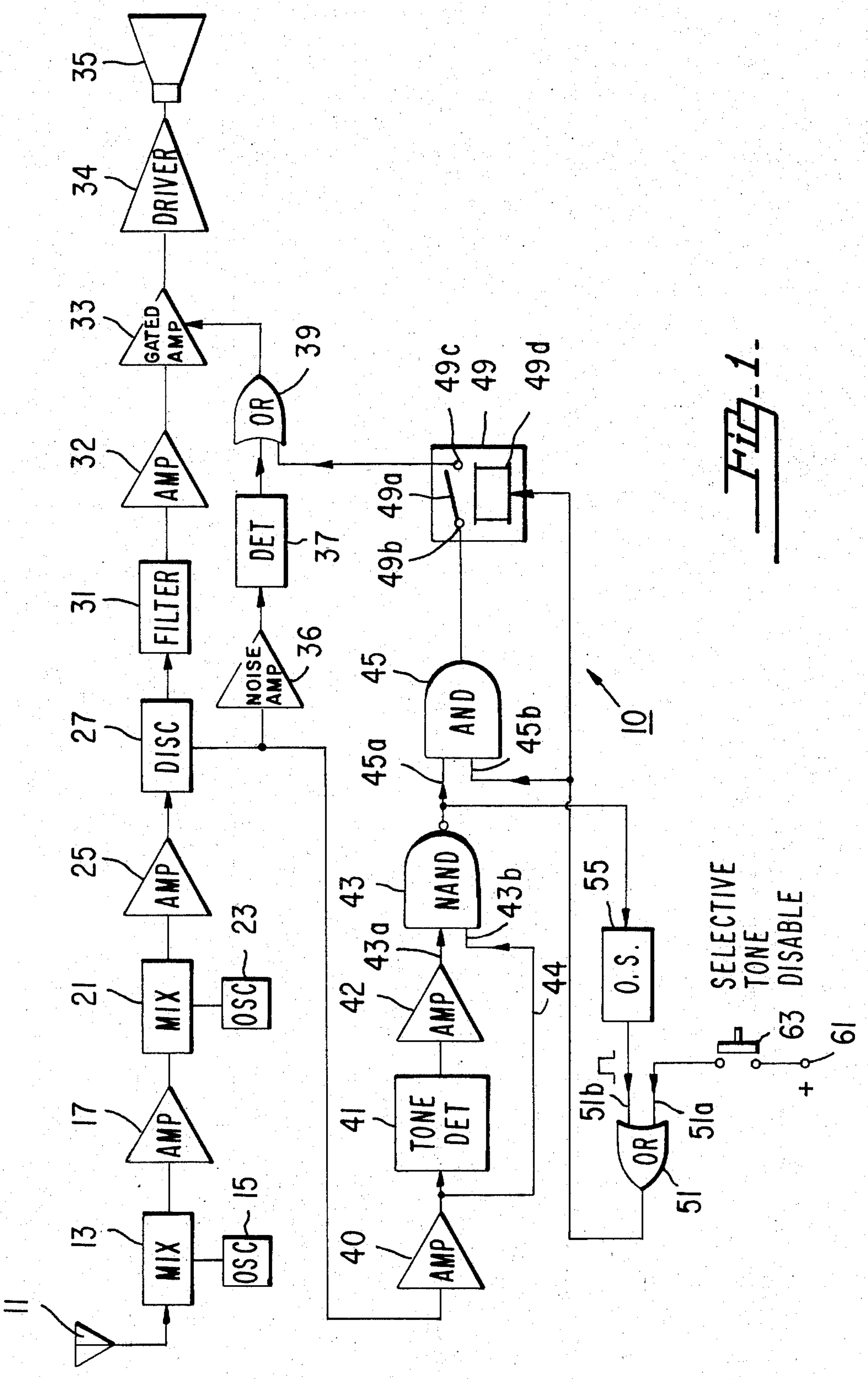
FIG. 1 is a block diagram of one embodiment of the present invention.

FIG. 1 is a block diagram of a voice, mobile communication receiver 10 with a tone operated selective calling system. The radio receiver 10 has an antenna 11 for coupling the received radio frequency signals to a mixer 13. At mixer 13, the signals are heterodyned with signals from local oscillator 15 to provide first intermediate frequency signals which are raised in level by and coupled to a second mixer 21 through amplifier 17. At mixer 21, the signals are heterodyned with signals from local oscillator 23 to provide a lower intermediate frequency signal. The lower intermediate frequency signal is raised in level and coupled to discriminator 27 by amplifier 25.

In a continuous tone coded squelch system, a subaudible tone is sent along with the voice. A tone reject filter 31 prevents this subaudible tone from reaching the speaker 35. The detected audio from the discriminator 27 is raised in level by amplifier 32 and coupled through gated audio amplifier 33 to the driver 34 and speaker 35.

The receiver includes a noise operated squelch system such that when no carrier is present at the discriminator 27, the noise from the discriminator 27 is applied to noise amplifier 36. The amplified noise is rectified by detector 37 and applied to gated audio amplifier 33 through OR gate 39 to cut-off the amplifier 33, squelching the noise. A finite period of time (typically 150 milliseconds) is required for this noise squelch circuit to operate following the end of voice transmission. Because of this delay, a noise burst typically follows the transmission. These noise bursts are referred to herein as squelch tails. In the system to be described squelch tail elimination is provided by a tone coded squelch system and the logic system for controlling the tone coded squelch system.

Considering the logic system of this receiver 10, a logic 1 level indicates a 10 volt level and a logic 0 level indicates a zero voltage level. A coincident NAND gate 43 is arranged to present a low or logic 0 output only during the presence of two logic 1 levels or high level signals at its input. If a low level or logic 0 level is present at either of the NAND gate 43 inputs, the NAND gate 43 is off and presents a high or logic 1 level at its output. An AND gate 45 presents a logic 1 level at its output only during the presence of all logic 1 level signals at its input, If any of the AND gate 45 input signals are at logic 0 level, the gate 45 is disabled and a logic 0 level is presented at its output. A one-shot multivibrator 55 is arranged so that it is triggered only when the input signal thereto goes from a low or logic 0 level to a high or logic 1 level. This one-shot multivibrator 55 when triggered provides at its output a high or logic 1 level pulse of 150 milliseconds duration, for example.

In the arrangement of FIG. 1, the tone coded squelch system includes amplifier 40, tone detector 41, amplifier 42 and NAND gate 43, a disabling circuit for the tone coded squelch system and an automatic inhibiting circuit for the disabling circuit includes AND gate 45, squelch control gate 49, OR gate 51, one-shot multivibrator 55 and a disable switch 63.

The output of the discriminator 27 fed to the noise squelch system 36, 37 and 39 is also fed through an amplifier 40 to the tone detector 41. The tone detector 41 may be a resonant reed device or an active filter device. In the case of a resonant reed device, the proper frequency tone, when received from the discriminator 27 and amplifier 40, will cause the reed to vibrate and induce a voltage in the reed's secondary coil. The tone selective output at amplifier 42 is coupled to a first terminal 43*a* of coincident NAND gate 43. The output of the discriminator 27 and amplifier 40 is also fed to a second terminal 43*b* of coincident NAND gate 43 via lead 44. The output of the NAND gate 43 is fed to a first input terminal 45*a* of AND gate 45 and to the input terminal of the one-shot multivibrator 55. The output terminal of the one-shot multivibrator 55 is coupled to a first terminal 51*b* of the OR gate 51. A disable switch 63, the operation of which will be described below, is coupled between a 10 volt or logic 1 level terminal 61 of a suitable power supply, not shown and a second terminal 51*a* of the OR gate 51. The output from OR gate 51 is coupled to a second input terminal 45*b* of AND gate 45 and to the gating terminal 49*d*, a solenoid for example, of squelch control gate 49. The output of AND gate 45 is coupled to the input terminal 49*b* and movable contacting arm 49*a* of the squelch control gate 49. The output terminal 49 *c* of the squelch control gate 49 is coupled to the OR gate 39, and through the OR gate 39 to the gated amplifier 33.

Figure 2:
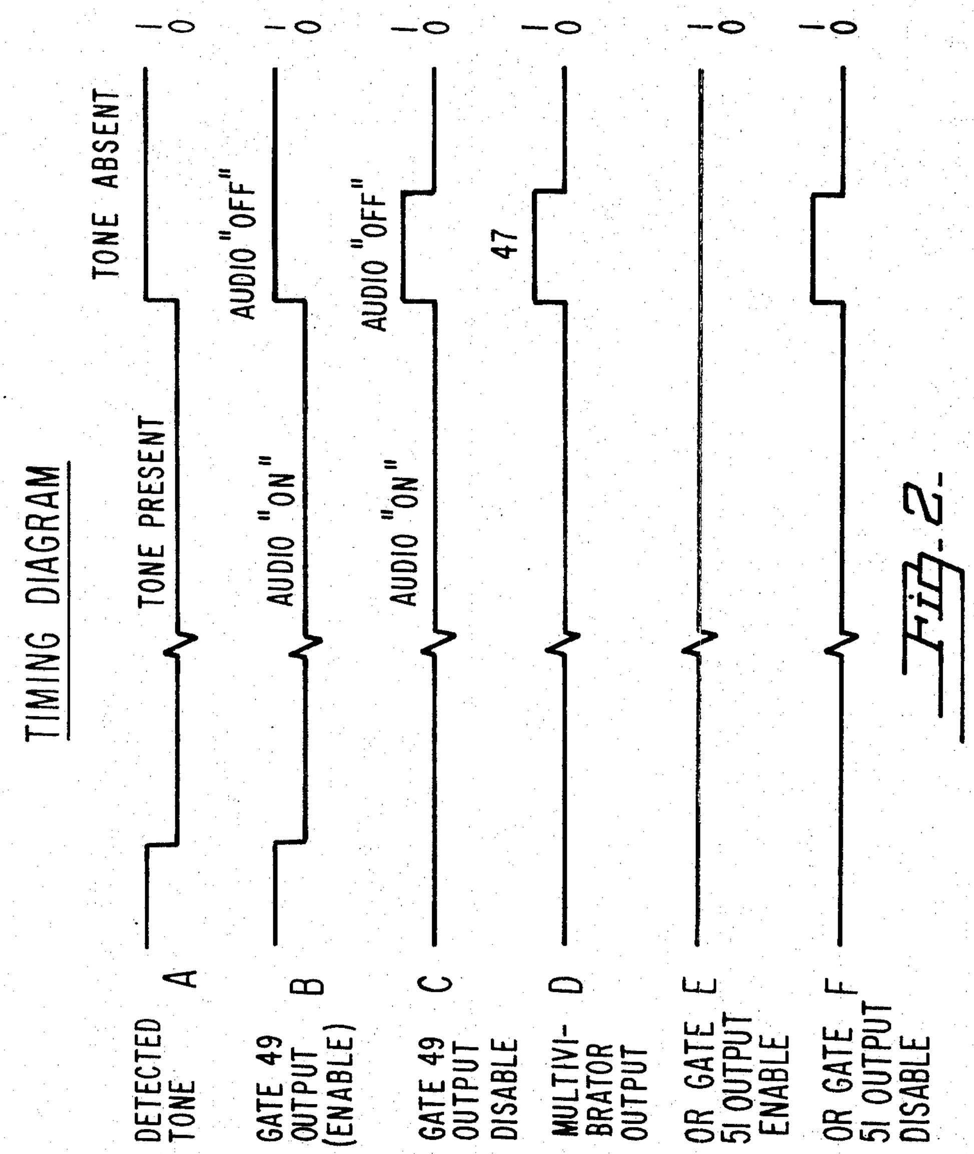
FIG. 2 is a timing diagram.

A series of waveforms is shown in FIG. 2 to assist in the understanding of the timing and operation of the tone coded squelch system in the receiver 10. Waveform A represents a detected tone input at input terminal 45*a* of AND gate 45. Waveform B represents the output at terminal 49*c* of the squelch control gate 49 when the tone coded squelch system is enabled. Waveform C represents the output at terminal 49*c* of the squelch control gate 49 when the tone coded squelch system is disabled. Waveform D represents the output from one-shot multivibrator 55 when the tone coded squelch system is disabled. Waveform E represents the output of OR gate 51 when the tone coded squelch system is enabled, and waveform F represents the output of OR gate 51 when the tone coded squelch system is disabled.

In describing the operation of the receiver 10, shown in FIG. 1, it is assumed for purposes of this description that the receiver 10 is included in a two-way radio system including a suitable transmitter, not shown, local to the receiver 10 and a further transmitter and receiver at some remote location, not shown. The remote transmitter communicating with the receiver 10 is further assumed to be of the type which transmits a subaudible tone of given phase and frequency along with the message intelligence. Upon the completion of the message, the tone terminates with the end of the message. The remote transmitter continues to transmit the carrier following the end of the message for approximately 150 milliseconds. During this period following the message, the remote transmitter may transmit only the carrier or it may be of the type which transmits along with the carrier a further tone of the same frequency but of reversed phase to the tone sent with the message. As discussed in the above-mentioned Peth U.S. Pat. No. 2,974,221 such transmission techniques are known and in themselves are not part of the present invention.

The operation of the receiver 10 when the tone coded squelch system is enabled for conventional operation is as follows. In this condition of operation and assuming that no message intelligence is being received, the noise squelch system 36, 37, 39 operates to gate off the gated amplifier 33, thus maintaining the receiver 10 in a squelched status. Likewise, since the tone detector 41 is not receiving the selected tone for the receiver 10, NAND gate 43 is open, and the tone coded squelch system is made operative to also gate amplifier 33 off.

The remote transmitter now begins to transmit a message accompanied by a tone to which the receiver 10 and the tone detector 41 are selective. The message and tone are coupled from the antenna 11 through the front end of the receiver 10 to the discriminator 27. The tone at the output of the discriminator 27 is detected by the tone detector 41. The detected tone is amplified and provides a high or logic 1 level to terminal 43a of NAND gate 43. There is also applied over lead 44 to terminal 43*b* of NAND gate 43 a second high or logic 1 level, since carrier and tone are present at the output of amplifier 40. Because of the two logic 1 levels at the input of NAND gate 43, the NAND gate 43 conducts and provides a logic 0 level at its output as indicated by the tone present level of waveform A. This logic 0 level is coupled to terminal 45*a* of AND gate 45.

In the condition when the tone coded squelch system is enabled, the disable switch 63, to be discussed in greater detail below, connects the terminal 61 to the terminal 51*a* of the OR gate 51, thus providing a high or logic 1 level at the terminal 51*a* of the OR gate 51. A high or logic 1 level is present at the terminal 45*b* of the AND gate 45 (see waveform E of FIG. 2). Further, the high or logic 1 level is fed to the terminal 49*d* of the squelch control gate 49, operating the contacting arm 49*a* to connect terminals 49*b* and 49*c* through the squelch control gate 49. Thus, a logic 0 and a logic 1 level are present at the respective terminals 45*a* and 45*b* of AND gate 45. The output of the AND gate 45 is at a low or logic 0 level. Even though the squelch control gate 49 has been operated to complete the contact of terminals 49*b*, 49*c* thereof, the low level or logic 0 (see waveform B of FIG. 2) coupled from the output of AND gate 45 to the OR gate 39 and gated amplifier 33 causes the receiver 10 to be unsquelched by the tone coded squelch system. Since the noise squelch system 36, 37, 39 is rendered inoperative by the presence of the received message, the received message is processed and fed to the speaker 35 in the usual manner.

Upon the termination of the message, the presence of the continued carrier at the discriminator holds the noise squelch system 36, 37, 39 off and quiets the receiver 10. The tone accompanying the message to which the tone detector 41 is selective ceases with the end of the message. Whether the remote transmitter is of the type which merely continues the carrier for a period after the end of the message or is of the type which sends a tone of reverse phase during this period, the absence of the tone sent with the message results in a low or logic 0 level at the terminal 43*a* and a high or logic 1 level at the terminal 43*b* of the NAND gate 43. The NAND gate 43 provides a high or logic 1 level at its output (see waveform A of FIG. 2). A high or logic 1 level now appears at both terminals 45*a* and 45*b* of AND gate 45, providing a high or logic 1 level at the output of AND gate 45. This high or logic 1 level is fed through the squelch control gate 49 (see waveform B of FIG. 2) and OR gate 39 to the gated amplifier 33, squelching the receiver. Thus, the tone coded squelch system operates to squelch the receiver 10 before the noise squelch system 36, 37, 39 is rendered responsive to the termination of the carrier, providing squelch tail elimination.

It should be noted that in the case where the remote transmitter sends a message but with a tone other than that to which the receiver 10 and tone detector 41 is selective, the presence of the carrier and message will render the noise squelch system 36, 37, 39 inoperative and in the absence of the tone coded squelch system cause the receiver 10 to be fully responsive to the message. The absence of the tone to which the tone detector 41 is responsive, provides a low or logic 0 level at the terminal 43*a* of the NAND gate 43. As above, the presence of the resulting high or logic 1 level at the output of the NAND gate 43 results in the continued squelching of the receiver. Thus, the presence of the tone coded squelch system maintains the squelched status of the receiver 10 independent of the status of the noise squelch system 36, 37, 39 and in the absence of the selected tone.

Now, let it be assumed that the operator local to the receiver 10 wants to originate a message. As discussed above, the operation of the tone coded squelch system and of the noise squelch system serves to maintain the receiver 10 off or squelched in the absence of a message sent to that receiver 10. The operator does not know whether other traffic may be present such that his transmission would break into an existing conversation. For the convenience of the operator and to minimize the manual operations required, the disable switch 63 may be made part of the microphone assembly so that when the microphone is removed from its hanger, the disable switch 63 breaks contact, disconnecting the terminal 51*a* of OR gate 51 from the terminal 61. A low or logic 0 level is present at the terminal 51*a* of OR gate 51 and also at terminal 45*b* of AND gate 45 and terminal 49*d* of squelch control gate 49 (see waveform F of FIG. 2). The squelch control gate 49 assumes a state in which the contacts 49*b* and 49*c* are disconnected. Thus, the operation of the disable switch 63 serves to disable the tone coded squelch system. Only the noise squelch system 36, 37, 39 is operative in response to any message traffic received, and the receiver 10 will process and monitor all message traffic to which it is receptive, regardless of the operation of the tone coded squelch system.

Once two-way message communication has been started between the local operator at receiver 10 and the remote operator, the remote transmitter will forward a message to the receiver 10 accompanied by the tone to which the tone detector 41 is responsive. A logic 1 or high level appears at terminal 43*a* of NAND gate 43. Likewise, a logic 1 or high level appears at terminal 43*b* of NAND gate 43. The logic 0 or low level at the output of NAND gate 43 is coupled to the input of the one-shot multivibrator 55 and to the terminal 45*a* of the AND gate 45. Since the multivibrator 55 is triggered only when the input thereto goes from a low or logic 0 level to a high or logic 1 level, the multivibrator 55 remains in that state wherein a low or logic 0 level is coupled to terminal 51*b* of OR gate 51. Both terminals 51*a* and 51*b* of OR gate 51 are at a low or logic 0 level, causing the squelch control gate 49 to maintain contacts 49*b* and 49*c* disconnected. The tone coded squelch system continues disabled, and the receiver 10 remains under the control of only the noise squelch system.

When the message from the remote transmitter is concluded, the tone accompanying that message ceases. The carrier continues with a tone of reversed phase or alone for 150 milliseconds, by way of example. A low or logic 0 level now is present at terminal 43*a* of NAND gate 43. The high or logic 1 level at the output of the NAND gate 43 appears at the terminal 45*a* of AND gate 45 and at the input of the one-shot multivibrator 55. The multivibrator 55 in response to the transition from a low or logic 0 level to a high or logic 1 level produces at its output a high or logic 1 level pulse of given duration, for example, 150 milliseconds. The multivibrator 55 thereafter returns to its state wherein a logic 0 or low level is present at the output thereof (see waveform D, pulse 47 of FIG. 2). The logic 1 or high level pulse is coupled through OR gate 51 (indicated by the pulse form on waveform F of FIG. 2), and for period of the pulse or 150 milliseconds provides a high or logic 1 level at the gate terminal 49*d* of squelch control gate 49. Also, the high or logic 1 level pulse appears at terminal 45*b* of AND gate 45. Since a high or logic 1 level also is present on the terminal 45*a* of AND gate 45 at this time, a high or logic 1 is present at the output of AND gate 45 and terminal 49*b* of the squelch control gate 49. The squelch control gate 49 is operated by the high or logic 1 at the terminal 49d thereof to connect the terminals 49*b* and 49*c* via the connecting arm 49. The logic 1 level or squelching level is coupled through the squelch control gate 49 and the OR gate 39 to the gated amplifier 33, squelching the receiver 10 (see the audio-off portion of waveform B of FIG. 2). The receiver 10 will remain squelched for the duration of the pulse output of the multivibrator 55, for example, 150 milliseconds. At the end of the pulse period, the tone coded squelch system is again automatically disabled by the squelch control gate 49 disconnecting terminals 49*b* and 49*c*, the receiver 10 returning to control only by the noise squelch system.

It can be seen that once the tone coded squelch system is disabled to permit the local operator to monitor the traffic condition, the performance of the receiver 10 will be subject to squelch tail following reception of each message thereby since the receiver 10 is only under the control of the noise squelch system. By the arrangement of the present invention, the disabling of the tone coded squelch system is temporarily and automatically inhibited at the end of each received message accompanied with a proper control tone, providing squelch tail elimination for those received messages. Thus, the local operator has the ability to monitor traffic without the presence of those objectionable squelch tail noises at his receiver associated with transmissions on his tone selective system.

What is claimed is:

1. In a tone coded squelch system for use in a communications receiver of the type including a noise-operated squelch means providing a first disabling squelch signal to a signal amplifier in the receiver a short time after termination of a received carrier wave wherein squelch tail noise is heard, the improvement thereof comprising: a tone-coded squelch means including means for providing a second disabling squelch signal at the termination of a tone of a given frequency or phase which is coextensive in time with a message signal modulation of said carrier wave and a normally-conducting path for coupling said second disabling squelch signal from said last-mentioned means to said signal amplifier, means to interrupt said normally conducting path so that received carrier waves accompanied by tones of other than said given frequency or phase will not be squelched, and timed means responsive to the termination of a tone of said given frequency or phase for momentarily closing said normally-conducting path when interrupted by said interrupt means to couple said second disabling squelch signal to said signal amplifier for a time period sufficient to eliminate said squelch tail noise.

2. In a tone coded squelch system for use in a communications receiver of the type including a noise-operated squelch means providing a first disabling squelch signal to a signal amplifier in the receiver a short time after termination of a received carrier wave wherein squelch tail noise is heard, the improvement thereof comprising: a tone-coded squelch means including means for providing a second disabling squelch signal at the termination of a tone of given frequency or phase which is coextensive in time with a message signal modulation of said carrier wave, gating means coupled to said last-mentioned means which when enabled by an enabling potential couples said second disabling squelch signal to said signal amplifier for squelching said amplifier at the termination of said tone, means for providing said enabling potential to said gating means, means to interrupt said enabling potential from a first source so that received carrier waves accompanied by tones of other than said given frequency or phase will not be squelched, and timed means responsive to the termination of a tone of said given frequency or phase to provide a second enabling potential from a second source to said gating means when said enabling potential from said first source is interrupted by said interrupt means for a time period substantially equal to the time of a squelch tail noise to cause said second disabling squelch signal to be applied to said signal amplifier for the time period of the squelch tail noise.

3. The combination claimed in claim 2 wherein said timed means is a pulse generator.

4. The combination claimed in claim 3 wherein said ulse generator is a multivibrator.

5. The combination claimed in claim 3 wherein said pulse generator provides said second enabling potential for a time period on the order of 150 milliseconds.

6. The combination claimed in claim 3 wherein said gating means includes a logic AND gate.

7. The combination claimed in claim 2 wherein said signal amplifier is an audio amplifier.

8. The combination claimed in claim 2 wherein said means for providing said second disabling squelch signal includes a tone detector.

* * * * *

UNITED STATES PATENT OFFICE

CERTIFICATE OF CORRECTION

Patent No. 3,810,023 Dated May 7, 1974

Inventor(s) Lee Francis Crowley et al

It is certified that error appears in the above-identified patent and that said Letters Patent are hereby corrected as shown below:

Column 8, line 14, after "potential" insert --from a first source--.

Column 8, line 16, after "from" change "a" to --said--.

Signed and sealed this 29th day of October 1974.

(SEAL)
Attest:

McCOY M. GIBSON JR.
Attesting Officer

C. MARSHALL DANN
Commissioner of Patents